Feb. 9, 1932.  E. A. STALKER  1,843,993
AIRPLANE WING
Filed Nov. 15, 1929

Inventor
Edward A. Stalker

Patented Feb. 9, 1932

1,843,993

UNITED STATES PATENT OFFICE

EDWARD A. STALKER, OF ANN ARBOR, MICHIGAN

AIRPLANE WING

Application filed November 15, 1929. Serial No. 407,392.

My invention relates to the augmentation of the wing lift by sucking off the boundary layer of air from the wing. In particular it relates to an improvement in the devices set forth in my Patent No. 1,691,942; Serial No. 213,906. The objects of my invention are, first, to provide for a rapid acceleration of the air turbine even though the airplane is not in motion; second, to recover a greater quantity of energy from the air stream for the same turbine size; third, to provide for reducing the resistance of the types of wing profiles in which the device of the above patent is most satisfactory.

The first two objects and the means of attaining them will be obtained by placing the Venturi tubes in the slipstream. The theory is as follows:

During the take-off of an airplane the velocity in the slipstream is usually of the order of 30% higher than that of the surrounding stream. Since the kinetic energy is proportional to the square of the velocity, the energy due to the increase in impact (dynamic) pressure is 69%. The total energy at the entrance of the venturi is then increased by 69%. But this is not all. The wing experiences a reduction of pressure on the upper surface which is proportional to the velocity squared. Hence the Venturi exit is in a region whose pressure has been reduced 69% as compared to the regions outside the slipstream. The energy the turbine recovers depends on the pressure difference between entrance and exit of the venturi. Hence in the slipstream the turbine can recover $1.69^2 = 2.86$ times as much energy as outside the slipstream. This increase of energy may be utilized to increase the suction pressure or the volume of air handled and hence improve the take-off and angle of climb or it may be used to reduce the size and hence the weight of turbine, blower and venturi. Such an increase in the performance characteristics of the airplane resulting from either of the above is of first importance in aircraft.

The third object is attained by causing the blower to discharge tangentially along the lower surface where there is danger of separation of the flow from the wing at low angles of attack. This occurs in wings possessing a large value of the maximum ordinate of the mean camber line or a large value of the maximum ordinate of the lower camber line.

Figure 1:
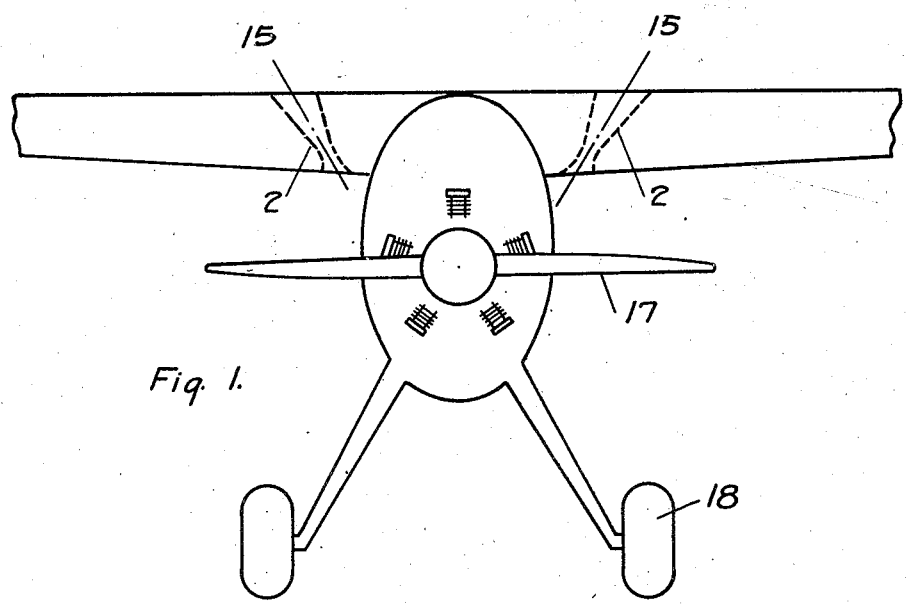
Figure 2:
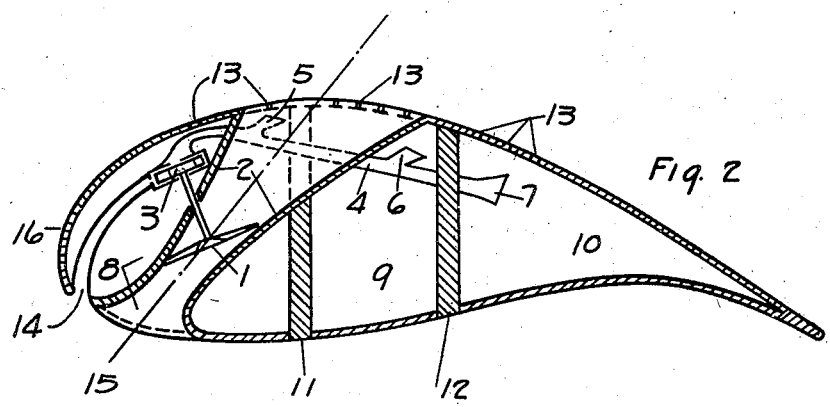
Figure 3:
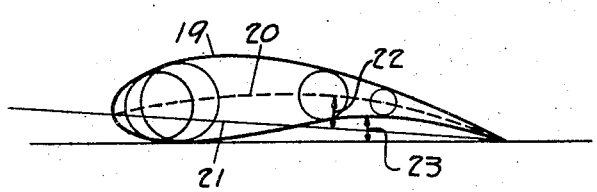

In the accompanying drawings Figure 1 shows a front view of the airplane and Figure 2 shows an inclined section through the venturi. Figure 3 defines a wing profile.

In Figure 2 the air turbine 1 drives the blower 3 which operates through the tube 4 and the openings 13 in the wing surface to withdraw air from the wing surface. The air is discharged through the duct 14 along the lower forward surface of the wing 16. The discharge speeds up the flow along the wing and prevents the formation of eddy resistance.

In Figure 3 the wing section is indicated by 19, the mean camber line by 20 and the lower camber line by 21. The ordinate of the mean camber line is indicated by 22 while that of the lower camber is given by 23.

I claim:

1. In an aircraft the combination of a wing possessing a slot in the lower surface, a duct, a prime mover in the duct dependent for its energy on the relative motion of the air past the aircraft, and actuating a means of producing a flow through the slot.

2. In an aircraft the combination of a wing whose maximum mean camber ordinate is greater than five per cent of the chord and whose lower surface contains a slot, a duct, a prime mover in the duct dependent for its energy on the relative motion of the air past the aircraft and actuating a means of producing a flow through the slot.

3. In an aircraft the combination of a wing whose maximum lower camber ordinate is greater than two per cent of the chord and whose lower surface contains a slot, a duct, a prime mover in the duct dependent for its energy on the relative motion of the air past the aircraft and actuating a means of producing a flow through the slot.

EDWARD A. STALKER.